(12) United States Patent
Sunstein

(10) Patent No.: US 6,580,596 B1
(45) Date of Patent: Jun. 17, 2003

(54) SOLENOID DRIVE CIRCUIT

(75) Inventor: Drew E. Sunstein, Exeter, NH (US)

(73) Assignee: Sunrise Labs, Inc., Manchester, NH (US)

( * ) Notice: Subject to any disclaimer, the term of this patent is extended or adjusted under 35 U.S.C. 154(b) by 275 days.

(21) Appl. No.: 09/685,722

(22) Filed: Oct. 11, 2000

Related U.S. Application Data

(60) Provisional application No. 60/158,816, filed on Oct. 12, 1999.

(51) Int. Cl.[7] .................................................. H01H 9/00

(52) U.S. Cl. ........................................ 361/160; 318/283

(58) Field of Search ................................. 361/160, 161, 361/162, 156, 155, 154; 318/282, 286, 280, 284, 762, 375, 760, 283

(56) References Cited

U.S. PATENT DOCUMENTS

| | | | | |
|---|---|---|---|---|
| 3,872,363 A | * | 3/1975 | Gross | 318/211 |
| 4,219,863 A | | 8/1980 | Takeshima | 361/156 |
| 4,374,352 A | * | 2/1983 | Webster | 318/762 |
| RE31,987 E | * | 9/1985 | Hartung et al. | 362/20 |
| 4,924,154 A | * | 5/1990 | Ogino | 318/286 |
| 5,079,667 A | * | 1/1992 | Kasano et al. | 361/156 |

FOREIGN PATENT DOCUMENTS

EP 0 743 147 A1 11/1996

* cited by examiner

Primary Examiner—Rajnikant B. Patel
(74) Attorney, Agent, or Firm—Bromberg & Sunstein LLP

(57) ABSTRACT

A capacitor is placed in series with a solenoid to bear a substantial portion of the voltage so that a reduced voltage energizes the solenoid. The solenoid may operate a brake on a motor. Applying voltage to operate the motor, energizes the solenoid which retracts the brake.

12 Claims, 2 Drawing Sheets

SOLENOID DRIVE CIRCUIT

The present application claims priority from U.S. Provisional Application No. 60/158,816, filed Oct. 12, 1999, the full disclosure of which is hereby incorporated by reference herein.

BACKGROUND OF THE INVENTION

The present invention is in the field of drive circuits for solenoids, particularly for use as a brake release in connection with a motor.

A prior art reversible motor 10 is shown in FIG. 1. The motor is a three terminal capacitor-start capacitor-run motor, including two wound coils. One terminal of the motor is connected to a clockwise winding. A second terminal is connected to a counterclockwise winding in the motor. A third terminal is for connection to the AC common input. A capacitor 12, referred to herein as the motor capacitor, is connected between the first and second windings to impose a phase angle shift on the AC input voltage to the opposite coil. The motor capacitor is selected to nominally provide about a 90° phase shift. An AC input voltage may be applied either to the clockwise winding or the counterclockwise winding to cause the motor to turn in one direction or the other. It has been found desirable in such a motor to provide a brake to more rapidly stop the motor when voltage is removed from the inputs. A typical brake is spring loaded so as to be biased into the stop position. A solenoid 14 is used to retract the brake when power is applied to the motor. The solenoid 14 is connected between the first and second terminals. When power is applied to either the first or second terminals of the motor, the solenoid is energized retracting the brake. The problem with this design is that the voltage across the two terminals and thus across the solenoid, is approximately twice the magnitude of the AC input voltage. For a 115 volt line, a solenoid is required that can handle over 200 volts. For a motor that plugs into a 230 volt line, the solenoid would need to be able to handle over 400 volts. Such solenoids are not commonly found and are unnecessarily expensive.

SUMMARY OF THE INVENTION

In accordance with an embodiment of the invention, a solenoid drive circuit is incorporated into the circuitry accompanying the motor in order to reduce the voltage across the solenoid. A capacitor is provided in series with an AC solenoid so as to divide the AC voltage between two terminals. Thus, an advantageously reduced voltage is provided across the solenoid to energize it for releasing the motor brake.

In an alternative embodiment of the invention, the brake release is formed by a DC solenoid. A diode bridge rectifier circuit is connected across the DC solenoid to steer an AC current through the DC solenoid in only one direction. A capacitor is coupled in series with the diode bridge rectifier and solenoid to divide the AC voltage. Thus, the DC voltage produced across the solenoid is reduced in magnitude relative to the AC voltage across the terminals. Thus, a reversible motor with an AC input voltage may be supplied with the brake release advantageously operated by a common low voltage solenoid.

Other objects and advantages of the invention will become apparent during the following description of the presently embodiments of the invention taken in conjunction with the drawings.

DETAILED DESCRIPTION OF THE PREFERRED EMBODIMENTS

Figure 1:
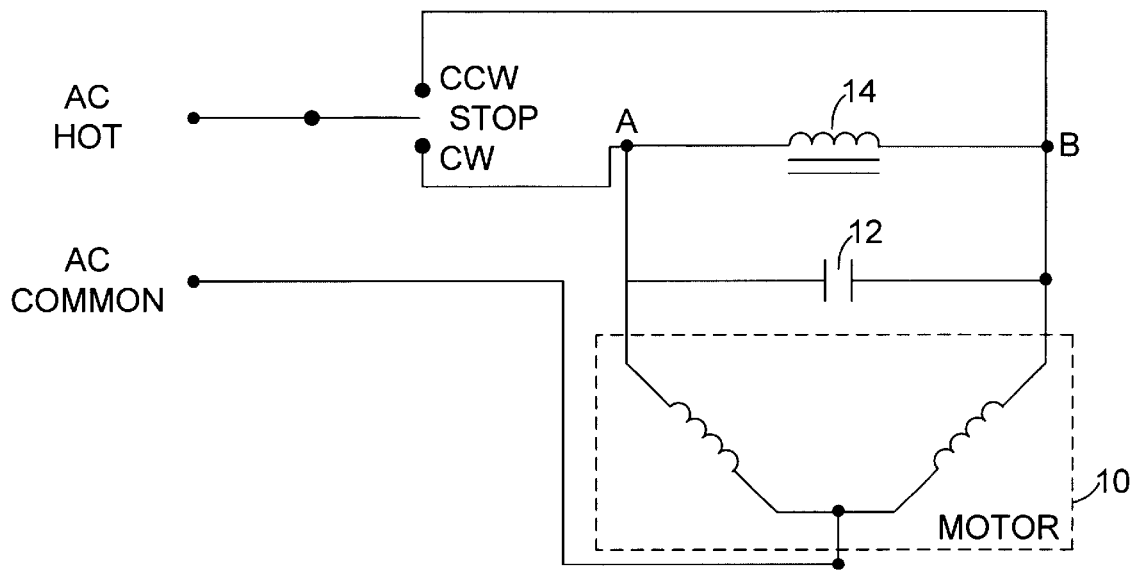
FIG. 1 is a circuit schematic of a reversible motor of the prior art.
Figure 2:
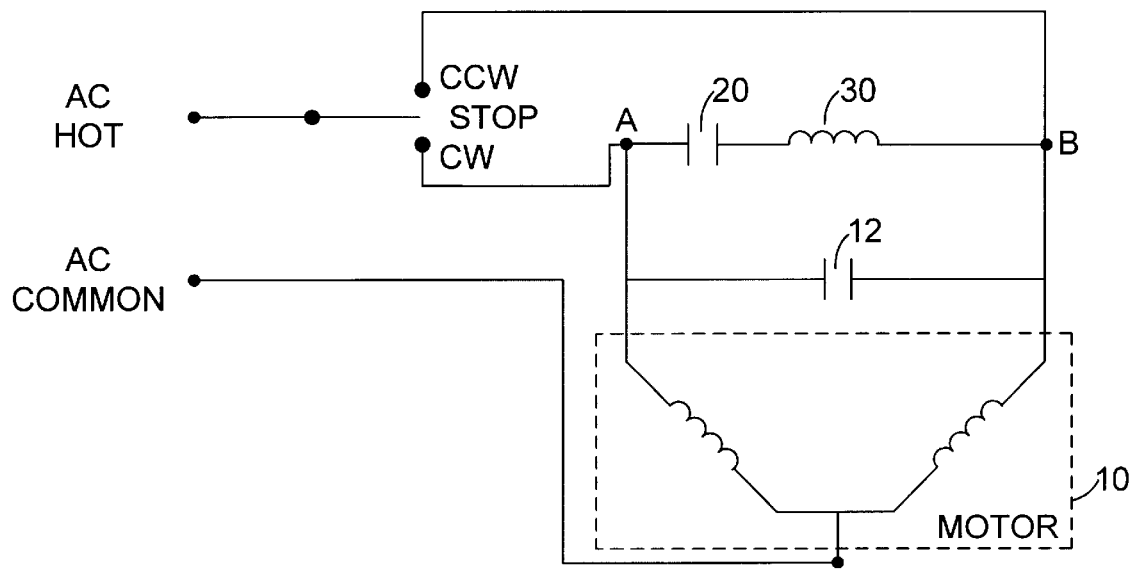
FIG. 2 is a circuit schematic of a first embodiment of the present invention.

In accordance with the first embodiment of the invention, a drive capacitor 20 is placed in series with an AC solenoid 30 as shown in FIG. 2. The capacitor 20 and solenoid 30 serve as a voltage divider in that a substantial amount of the voltage between the first terminal A of the motor 10 and the second terminal B of the motor 10 is developed across the drive capacitor. In a preferred embodiment, the voltage across the drive capacitor 20 is at least a quarter of the voltage between the first terminal A and the second terminal B. In a more preferred embodiment, the voltage across the drive capacitor 20 exceeds that across the solenoid 30. The voltage across the solenoid has been reduced by including the drive capacitor so that a less expensive solenoid could be used in the circuit. When AC voltage is applied across terminals A and B to drive the motor 10, the brake is pulled away from the motor 10 by the solenoid 30 and the motor is allowed to turn. When the AC voltage is removed, the solenoid is deactivated and the motor is braked.

Figure 3:
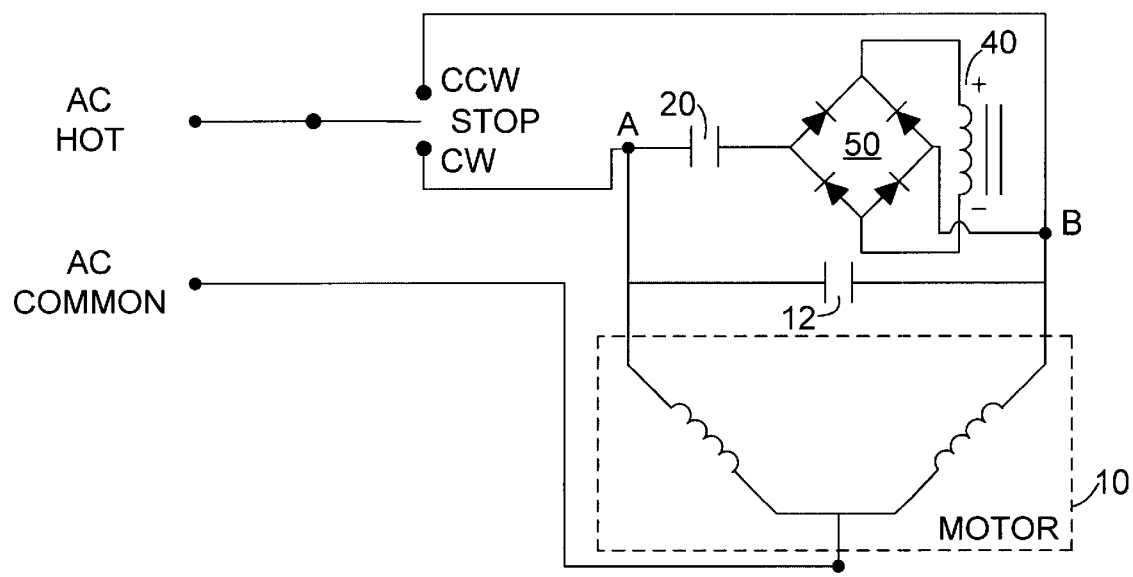
FIG. 3. is a circuit schematic of a second embodiment of the present invention.

The use of a drive capacitor 20 may be further adapted for use with a DC solenoid 40 as shown in FIG. 3. Here, a diode bridge rectifier 50 is connected across a DC solenoid to steer a current in only one direction through the solenoid. The drive capacitor 20 is in series with the diode bridge rectifier 50 and the DC solenoid 40, all coupled between the A and B terminals of the reversible motor. Thus, the AC voltage across terminals A and B is divided between the drive capacitor 20 and the DC solenoid 40. The divided AC voltage is applied as direct current by the rectifier to the DC solenoid. The DC solenoid is used as the brake release for the motor. When input voltage is applied to one of the motor terminals, the brake is pulled away from the motor by the solenoid and the motor turns. When the input voltage is removed, the solenoid is deactivated and the motor is braked.

In accordance with the presently preferred DC solenoid embodiment, for a 115 volt AC input voltage, a 0.33 microfarad capacitor rated for 200 volts is used as the drive capacitor. For a 230 input voltage, a 0.12 microfarad capacitor rated at 250 volts is used. Note that the voltage across terminal A and terminal B of the motor is twice the input voltage. By using the drive capacitor, a 4 watt 110 volt DC solenoid of 3.2K winding resistance may be used for the brake release. The motor capacitor 12 connected at either end to the A and B terminals as used in such present embodiments were 4 microfarad and 1 microfarad for 115 VAC and 230 VAC motors, respectively. Thus, the brake circuit provided only a light load on the motor capacitor.

Of course, it should be understood that various changes and modifications to the preferred embodiments described above will be apparent to those skilled in the art. For example, the solenoid drive circuit may be used in other applications where an AC voltage is the input and a solenoid is required. Such changes can be made without departing from the spirit and scope of the invention and without diminishing its attendant advantages. It is, therefore, intended that such changes and modifications be covered by the following claims.

I claim:

1. A solenoid drive circuit comprising:

an AC solenoid;

a capacitor in series with said AC solenoid; and an AC voltage applied across said AC solenoid and said capacitor, such that the AC voltage is divided between said capacitor and said AC solenoid to provide a reduced voltage to energize said AC solenoid.

2. The solenoid drive circuit of claim 1 further comprising a motor connected across said AC solenoid and said capacitor and a brake connected to inhibit movement of said motor wherein said AC solenoid is connected to said brake to retract said brake when said AC solenoid is energized.

3. The solenoid drive circuit of claim 2 further comprising a motor capacitor connected in parallel with said AC solenoid and said capacitor.

4. The solenoid drive circuit of claim 2 where in said motor comprises a three terminal motor including a first terminal coupled to a clockwise winding, a second terminal coupled to a counterclockwise winding and a third terminal.

5. A solenoid drive circuit comprising:

a DC solenoid;

a bridge rectifier connected across said DC solenoid;

a capacitor in series with said rectifier and said DC solenoid;

an AC voltage applied across said rectifier, solenoid and capacitor such that the AC voltage is divided between said capacitor and said DC solenoid to provide a voltage reduced in magnitude relative to said AC voltage to energize said DC solenoid.

6. The solenoid drive circuit of claim 5 further comprising a motor connected across said bridge rectifier and said capacitor and a brake connected to inhibit movement of said motor wherein said DC solenoid is connected to said brake to retract said brake when said DC solenoid is energized.

7. The solenoid drive circuit of claim 6 further comprising a motor capacitor connected in parallel with said bridge rectifier and said capacitor.

8. The solenoid drive circuit of claim 6 wherein said motor comprises a three terminal motor including a first terminal coupled to a clockwise winding, a second terminal coupled to a counterclockwise winding and a third terminal.

9. A reversible motor comprising:

a three terminal motor including a first terminal coupled to a clockwise winding, a second terminal coupled to a counterclockwise winding and a third terminal;

a capacitor coupled between the first terminal and the second terminal;

an AC input voltage applied across the third terminal and one of the first and second terminals, wherein said capacitor develops a voltage between the first and second terminal greater than said AC input voltage;

a solenoid connected in parallel with said capacitor; and a drive capacitor coupled to said solenoid in between the first terminal and the second terminal so as to bear a substantial portion of the voltage across the first and second terminals and thereby energize said solenoid with a reduced voltage.

10. The reversible motor of claim 9 wherein said drive capacitor bears at least one half of the voltage across the first and second terminals.

11. The reversible motor of claim 9 wherein said solenoid comprises a DC solenoid and further comprising a diode bridge connected across said DC solenoid to steer current through said DC solenoid in only one direction.

12. The reversible motor of claim 9 further comprising a brake coupled to said solenoid so that energizing said solenoid releases said brake.

* * * * *